United States Patent
Nogueira Dias et al.

(10) Patent No.: US 12,556,092 B2
(45) Date of Patent: Feb. 17, 2026

(54) BUCK CONVERTER CONTINUOUS CONDUCTION OPERATION

(71) Applicant: Apple Inc., Cupertino, CA (US)

(72) Inventors: Nuno M Nogueira Dias, Swindon (GB); Carlos Andre Faria Calisto, Swindon (GB)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 18/582,018

(22) Filed: Feb. 20, 2024

(65) Prior Publication Data

US 2025/0266764 A1    Aug. 21, 2025

(51) Int. Cl.
*H02M 3/158*    (2006.01)

(52) U.S. Cl.
CPC ................................. *H02M 3/158* (2013.01)

(58) Field of Classification Search
CPC ................................. H02M 3/158; H02M 3/07
See application file for complete search history.

(56) References Cited

U.S. PATENT DOCUMENTS

| | | | | |
|---|---|---|---|---|
| 6,314,028 B1 * | 11/2001 | Kono | ........ | G11C 7/065 365/205 |
| 6,329,139 B1 * | 12/2001 | Nova | ........ | B82Y 10/00 506/40 |
| 2008/0019201 A1 * | 1/2008 | Seno | ........ | G11C 7/08 365/203 |
| 2016/0190921 A1 | 6/2016 | Kumar et al. | | |
| 2022/0231518 A1 | 7/2022 | Kun et al. | | |
| 2023/0238887 A1 | 7/2023 | Lim | | |

FOREIGN PATENT DOCUMENTS

WO    2022169481 A1    8/2022

OTHER PUBLICATIONS

Wikipedia, "Buck Converter," https://en.wikipedia.org/wiki/Buck_converter#:~:text=A%20buck%20converter%20or%20step,of%20switched%2Dmode%20power%20supply. last accessed Nov. 30, 2023, 16 pages.

* cited by examiner

*Primary Examiner* — Adolf D Berhane
*Assistant Examiner* — Afework S Demisse
(74) *Attorney, Agent, or Firm* — Fletcher Yoder, P.C.

(57) ABSTRACT

Systems and methods described herein correspond to voltage regulator operations that enable voltage regulation even while an inductor current of the voltage regulator approaches or is at 0 amps (A). A voltage regulator may be operated in a three-level (3L) mode until a capacitor voltage is detected as out of regulation. The voltage regulator may be operated in a two-level (2L) mode to enable auxiliary circuitry to adjust the capacitor voltage back into regulation without adjusting a current supplied to a load. While the capacitor voltage is in regulation, the voltage regulator may operate in the 3L mode. The voltage regulator operations described herein enable continuous conduction operations near zero, which may reduce or eliminate a likelihood of switching harmonics being introduced as noise into power supplied from the voltage regulator.

20 Claims, 11 Drawing Sheets

BUCK CONVERTER CONTINUOUS CONDUCTION OPERATION

BACKGROUND

This disclosure relates to systems and methods of power management circuitry of a semiconductor device and, more particularly, to power converters.

Integrated circuits are found in a vast array of electronics devices, including computers, handheld devices, wearable devices, vehicles, robotics, and more. An electronic device may be operated into various operational modes, such as a normal mode, a powered-off mode, and a reduced-power mode, among others. In some systems, circuit blocks designed to perform various functions may be designed to operate at different power supply levels. Power management circuitry may vary power supply levels delivered to the different circuit blocks.

Power management circuits sometimes include one or more power converter circuits that generate regulated voltage levels based on an input power supply signal. Such regulator circuits may employ different operations to regulate a respective voltage level. For example, a power converter may be buck converter, sometimes described as a step-down converter, or another suitable regulator. Yet operating these power circuits could result in switching harmonics being introduced into generated supply signals as noise. Noise in the supply signals may be difficult to filter out and/or may undesirably reduce accuracy downstream system operations based on the signals generated.

SUMMARY

Computer systems may include multiple circuits to perform specific operations. The circuits may be fabricated on one or more substrates and may use different power supply voltage levels. Power Management Units (PMUs) may include multiple power converter circuits that generate regulated voltage levels for various power supply signals delivered to one or more loads. Such power converter circuits may be designed to keep a voltage constant in view of changes in input voltage or circuit load. As part of this, the PMU may include or couple to power converters, like a buck converter, and rails, like a power rail.

The power converter circuits may regulate a voltage output based on load power consumption by maintaining the voltage output around a setpoint and varying output current to power the load. The power converter circuit, like a buck converter, may step down an input voltage to a lower, second voltage based on a flying capacitor (flycap) that acts like a floating power supply for the load. Should that load be operated to consume less power, the buck converter may respond by reducing an output current and maintaining the regulated voltage output at the second voltage based on charging or discharging the flycap.

A three-level (3L) buck converter may transmit a current waveform (e.g., inductor current) above 0 amps (A) or below 0 A—in other words, transmit the current waveform that has positive values with a minimum value being no lower than 0 A or negative values with a maximum value being no greater than 0 A—to enable suitable management of the charge of the flycap. This may be due to direction of the inductor current may become unpredictable or immeasurable around 0 A, or when the waveform has a zero-crossing. Indeed, the flycap may charge or discharge due to the current direction interacting unexpectedly with buck converter operations, as may happen if the buck converter is operated into a mode expected to charge the flycap and the current actually transmitted discharges the flycap. Unexpected charging or discharging of the flycap may lead to the load being supplied unregulated outputs, which may affect operation of the load (e.g., over current conditions). To cure this, control circuitry may operate the 3L buck converter according to discontinuous conduction operations that avoids transmitting the inductor current when within a threshold amount from 0 A.

To implement the discontinuous conduction operations, the control circuitry may operate an output of the buck converter into tristate to avoid transmitting the inductor current when within the threshold amount from 0 A. The output being in tristate stops the 3L buck converter from outputting the inductor current to the load. Although the discontinuous conduction operation stops transmission of unregulated power to the load, the discontinuous conduction operation increases a likelihood of switching harmonics being introduced into power supplies of the electronic device. Switching harmonics may introduce noise into supplied signals. Noise in the supplied signals may reduce reliability and/or be difficult to filter out. Thus, continuous conduction operations that are compatible with near 0 A inductor current generation (e.g., generation of an inductor current with a zero-crossing) may be desired.

Systems and methods described herein may enable the control circuitry to control the buck converter to generate an inductor current with zero-crossing as part of a continuous conduction operation. The buck converter may generate a relatively low amounts of power while operating in a continuous conduction operation, even when the generated voltage is regulated and the inductor current has a zero-crossing or is around zero. These systems and methods may improve buck converter operations by generating relatively small currents without increasing a likelihood of switching harmonics being introduced into power supplies.

BRIEF DESCRIPTION OF THE DRAWINGS

Various aspects of this disclosure may be better understood upon reading the following detailed description and upon reference to the drawings described below.

DETAILED DESCRIPTION

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Figure 1:
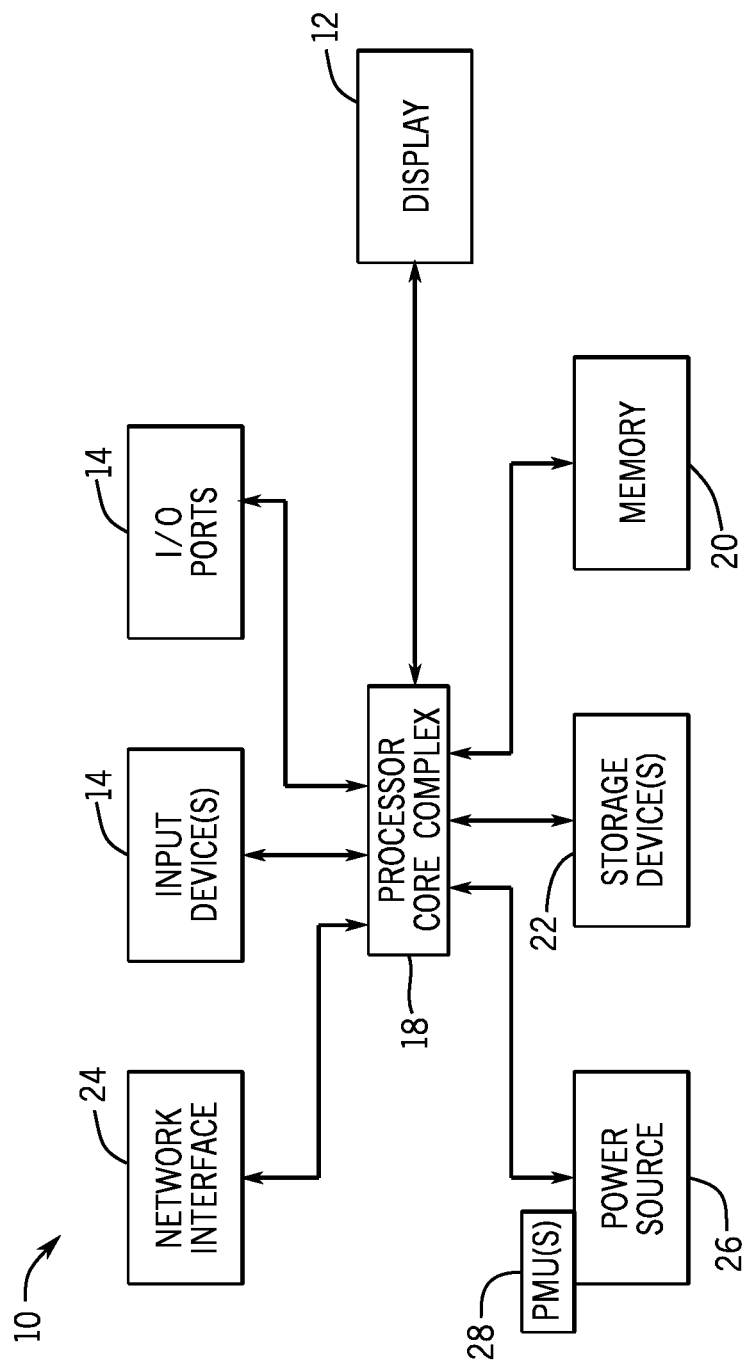
FIG. 1 is a schematic block diagram of an electronic device, in accordance with an embodiment.

This disclosure relates to an electronic device that includes a power management unit (PMU). The electronic device 10 may be any suitable electronic device, such as a computer, a mobile phone, a portable media device, a tablet, a television, a virtual-reality headset, a wearable device such as a watch, a vehicle and/or vehicle dashboard, or the like. FIG. 1 is intended to represent one example of a particular implementation and is intended to illustrate the types of components that may be present in the electronic device 10.

The electronic device 10 of FIG. 1 includes an electronic display 12, one or more input devices 14, one or more input/output (I/O) ports 16, a processor core complex 18 having one or more processor(s) or processor cores, local memory 20, a main memory storage device 22, a network interface 24, a power source 26 (e.g., power supply), and a power management unit (PMU) 28. The various components described in FIG. 1 may include hardware elements (e.g., circuitry), software elements (e.g., a tangible, non-transitory computer-readable medium storing executable instructions), or a combination of both hardware and software elements. It should be noted that the various depicted components may be combined into fewer components or separated into additional components. For example, the local memory 20 and the main memory storage device 22 may be included in a single component.

The processor core complex 18 is operably coupled with local memory 20 and the main memory storage device 22. Thus, the processor core complex 18 may execute instructions stored in local memory 20 or the main memory storage device 22 to perform operations, such as generating or transmitting image data to display on the electronic display 12. As such, the processor core complex 18 may include one or more general purpose microprocessors, one or more application specific integrated circuits (ASICs), one or more field programmable gate arrays (FPGAs), or any combination thereof.

In addition to program instructions, the local memory 20 or the main memory storage device 22 may store data to be processed by the processor core complex 18. Thus, the local memory 20 and/or the main memory storage device 22 may include one or more tangible, non-transitory, computer-readable media. For example, the local memory 20 may include random access memory (RAM) and the main memory storage device 22 may include read-only memory (ROM), rewritable non-volatile memory such as flash memory, hard drives, optical discs, or the like.

The network interface 24 may communicate data with another electronic device or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, or a wide area network (WAN), such as a 4G, Long-Term Evolution (LTE), or 5G cellular network. The power source 26 may provide electrical power to one or more components in the electronic device 10, such as the processor core complex 18 or the electronic display 12. Thus, the power source 26 may include any suitable source of energy, such as a rechargeable lithium polymer (Li-poly) battery or an alternating current (AC) power converter. One or more PMU(s) 28 may help distribute power to various circuitries of the electronic device 10. Although multiple PMUs 28 may be described herein, for ease of description, these multiple PMUs 28 may sometimes be referred to herein as the PMU 28. Some descriptions included herein may apply to systems with one PMU 28 and/or to systems with multiple PMUs 28. Furthermore, PMUs 28 may include different components relative to each other, for example some PMUs 28 may include regulators while other PMUs 28 may not include regulators, as is described further herein. Some PMUs 28 may be themselves and/or couple to power one or more chip packages (e.g., as one or more loads). The chip package may include distinct die, powered by respective or the same buck converters, where one or more distinct die may be communicatively coupled to each other. The chip package of the PMU 28 may include one or more buck converters (e.g., one or more multi-level buck converter) for one or more of the respective distinct die.

The I/O ports 16 may enable the electronic device 10 to interface with other electronic devices. For example, when a portable storage device is connected, the I/O port 16 may enable the processor core complex 18 to communicate data with the portable storage device. The input devices 14 may enable user interaction with the electronic device 10, for example, by receiving user inputs via a button, a keyboard, a mouse, a trackpad, a touch sensing, or the like. The input device 14 may include touch-sensing components (e.g., touch control circuitry, touch sensing circuitry) in the electronic display 12. The touch-sensing components may receive user inputs by detecting occurrence or position of an object touching the surface of the electronic display 12.

Figure 2:
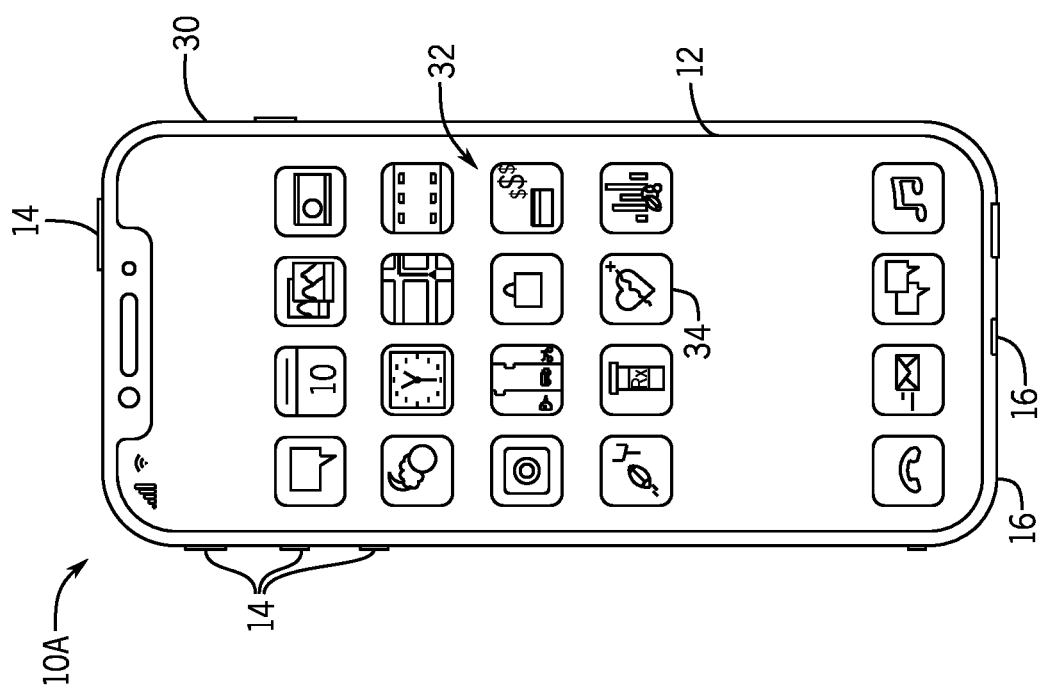
FIG. 2 is a front view of a mobile phone representing an example of the electronic device of FIG. 1, in accordance with an embodiment.

The electronic device 10 may take any suitable form. One example of the electronic device 10 in the form of a handheld device 10A is shown in FIG. 2. The handheld device 10A may be a portable phone, a media player, a personal data organizer, a handheld game platform, or the like. For illustrative purposes, the handheld device 10A may be a smartphone, such as any IPHONE® model available from Apple Inc.

The handheld device 10A includes an enclosure 30 (e.g., housing). The enclosure 30 may protect interior components from physical damage or shield them from electromagnetic interference, such as by surrounding the electronic display 12. The electronic display 12 may display a graphical user interface (GUI) 32 having an array of icons. When an icon 34 is selected either by an input device 14 or a touch-sensing component of the electronic display 12, an application program may launch.

The input devices 14 may be accessed through openings in the enclosure 30. The input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, or toggle between vibrate and ring modes.

Figure 3:
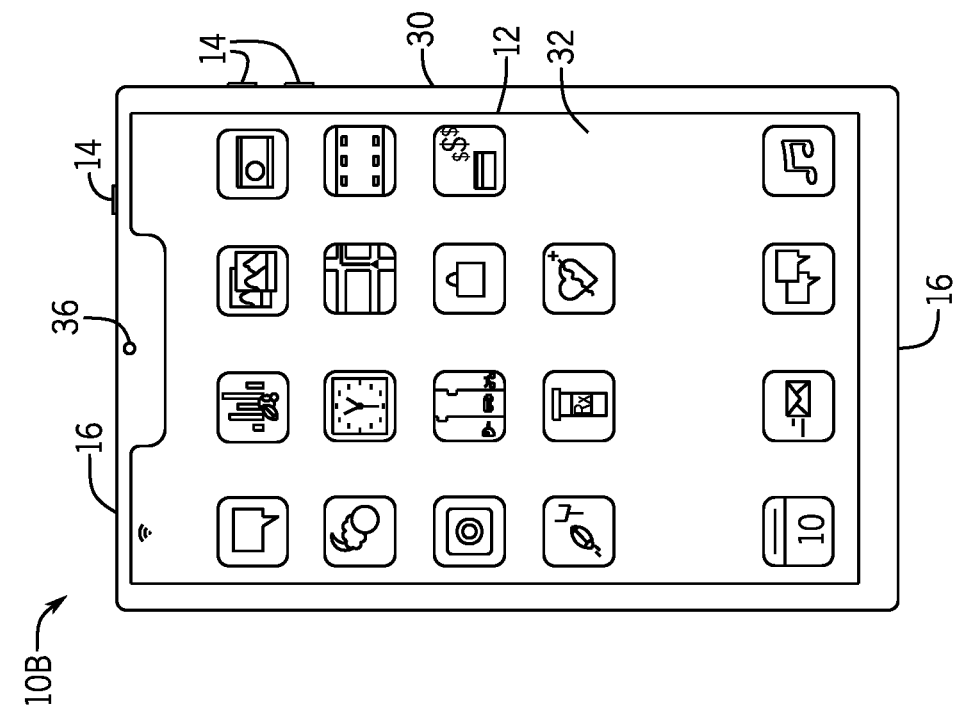
FIG. 3 is a front view of a tablet device representing an example of the electronic device of FIG. 1, in accordance with an embodiment.
Figure 4:
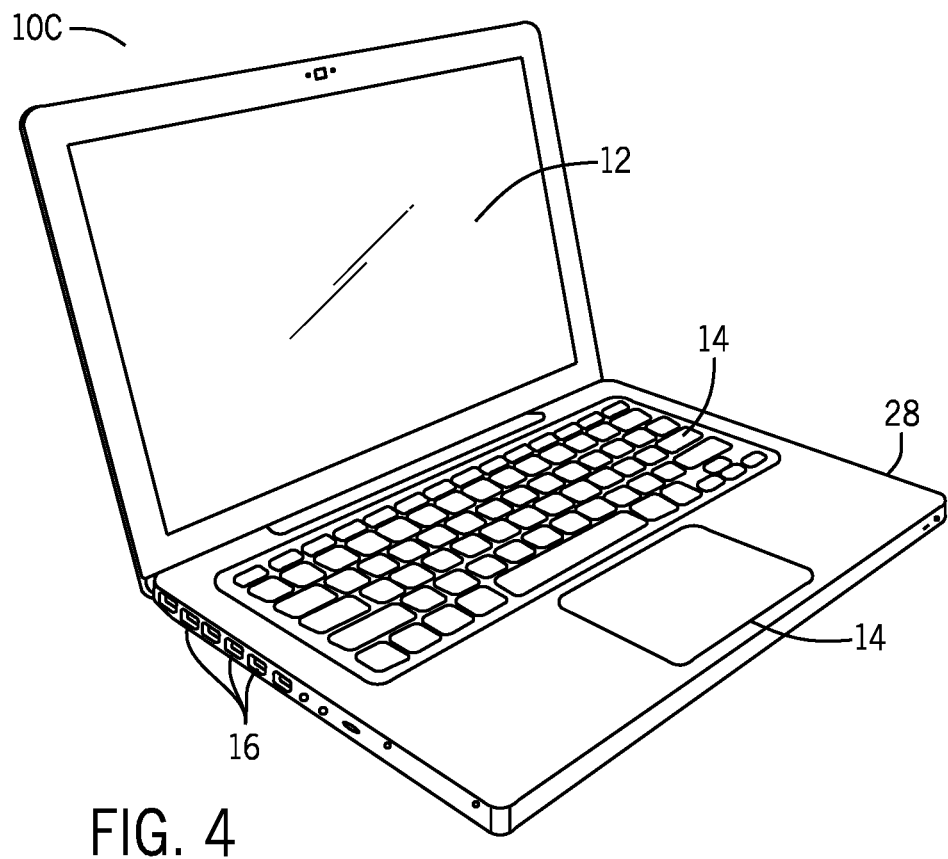
FIG. 4 is a front view of a notebook computer representing an example of the electronic device of FIG. 1, in accordance with an embodiment.
Figure 5:
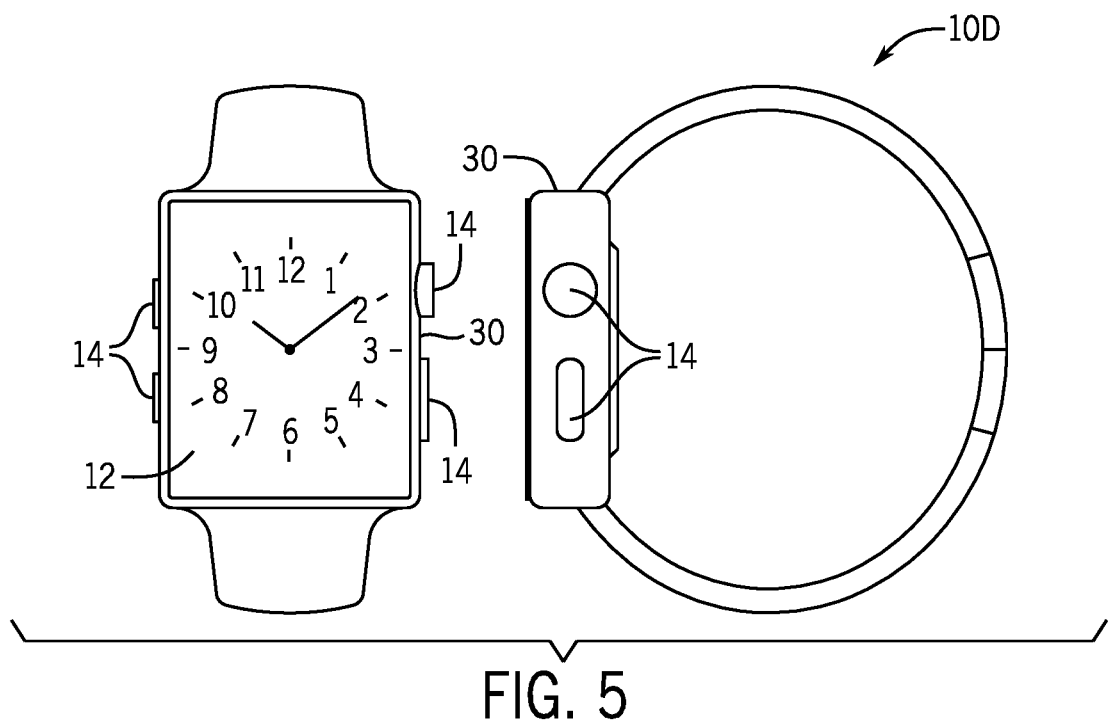
FIG. 5 are front and side views of a watch representing an example of the electronic device of FIG. 1, in accordance with an embodiment.

Another example of a suitable electronic device 10, specifically, a tablet device 10B, is shown in FIG. 3. The tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a watch 10D, is shown in FIG. 5. For illustrative purposes, the watch 10D may be any APPLE WATCH® model available from Apple Inc. As depicted, the tablet device 10B, the computer 10C, and the watch 10D each also includes an electronic display 12, input devices 14, I/O ports 16, and an enclosure 30. The electronic display 12 may display a GUI 32. Here, the GUI 32 shows a visualization of a clock. When the visualization is selected either by the input device 14 or a touch-sensing component of the electronic display 12, an application program may launch, such as to transition the GUI 32 to presenting the icons 34 discussed in FIGS. 2 and 3.

Referring back to FIG. 1, circuitry of the electronic device 10, such as those illustrated in FIG. 1, may be fabricated on one or more substrates and may employ different power source 26 voltage levels. The PMU 28 may control and/or monitor signals delivering the electrical power from the power source 26, which may be done based on one or more voltage regulator circuits that generate regulated voltage levels to be delivered to the various circuitries of the electronic device 10. For example, the PMU 28 may adjust the electrical power delivered to one or more domains, such as an analog domain, a digital domain, or the like. The PMU 28 may adjust the voltage levels based on operational modes instructed by the processor core complex 18 and/or based on expected or desired energy consumption levels of one or more different components or systems of the electronic device 10.

Such voltage regulator circuits may employ both passive circuit elements (e.g., inductors, capacitors) as well as active circuit elements (e.g., transistors, diodes). Different types of voltage regulator circuits may be employed based on power usage of load circuits, available circuit area, and the like. One type of voltage regulator circuit is a buck converter circuit (e.g., buck regulator), such as the buck converter depicted in FIGS. 8-9 and discussed herein.

Figure 6:
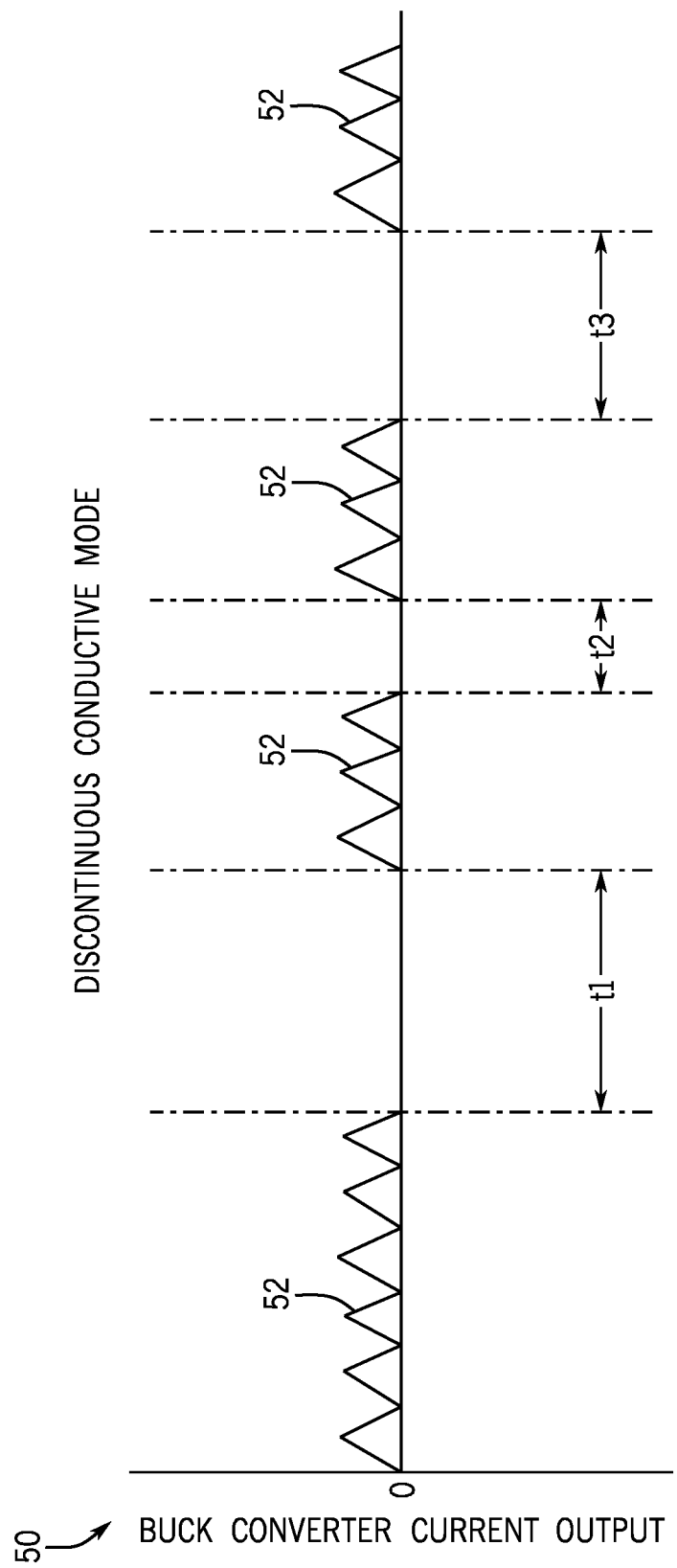
FIG. 6 is a plot of a simulated current output from a buck converter operated by control circuitry in a discontinuous conduction operation, in accordance with an embodiment.

Keeping the foregoing in mind, FIG. 6 is a plot 50 of a current 52 output simulated over time (t) from a buck converter operated by control circuitry in a discontinuous conduction operation. Although the current 52 output from the buck converter corresponds to the inductor current when the inductor current is transmitted from the buck converter, sometimes the current 52 transmitted from the buck converter differs in waveform from the inductor current, such as when the buck converter is operated to not output the inductor current (and thus the output current 52 goes to 0 A for a period of time).

In the discontinuous conduction operation, control circuitry stops the buck converter from outputting the current 52 when the inductor current of the buck converter drifts too close to 0 amps (A) or involves a zero-crossing. At and around 0 A, the direction (e.g., positive, negative) of the inductor current cannot be detected through reasonable methods able to be included in consumer electronics, if at all. To solve this uncertainty, when the inductor current is detected to be within a threshold from 0 A, the output of the buck converter may be operated into tristate to prevent the inductor current from being output. This corresponds to the gaps in transmissions of the current 52. For example, in FIG. 6, the buck converter for time periods t1, t2, and t3 was simulated as being operated into tristate to block the inductor current 52 from being output. The discontinuous conduction operation helps prevent downstream over voltage conditions from arising based on unpredictable charging around the inductor current of 0 A. The discontinuous conduction operation may introduce switching harmonics, or noise. For example, the time periods t1, t2, and t3 represent non-equal switching time periods that introduce switching harmonics into the supply of the inductor current.

Systems and methods described herein enable continuous conduction operation of the buck converter even while the inductor current drifts close to 0 A or involves a zero crossing. Doing so may prevent downstream over voltage conditions from arising while also reducing or eliminated introduced switching harmonics, which may increase a likelihood of reliable operation of downstream circuitry relative to discontinuous conduction operation of FIG. 6.

Figure 7:
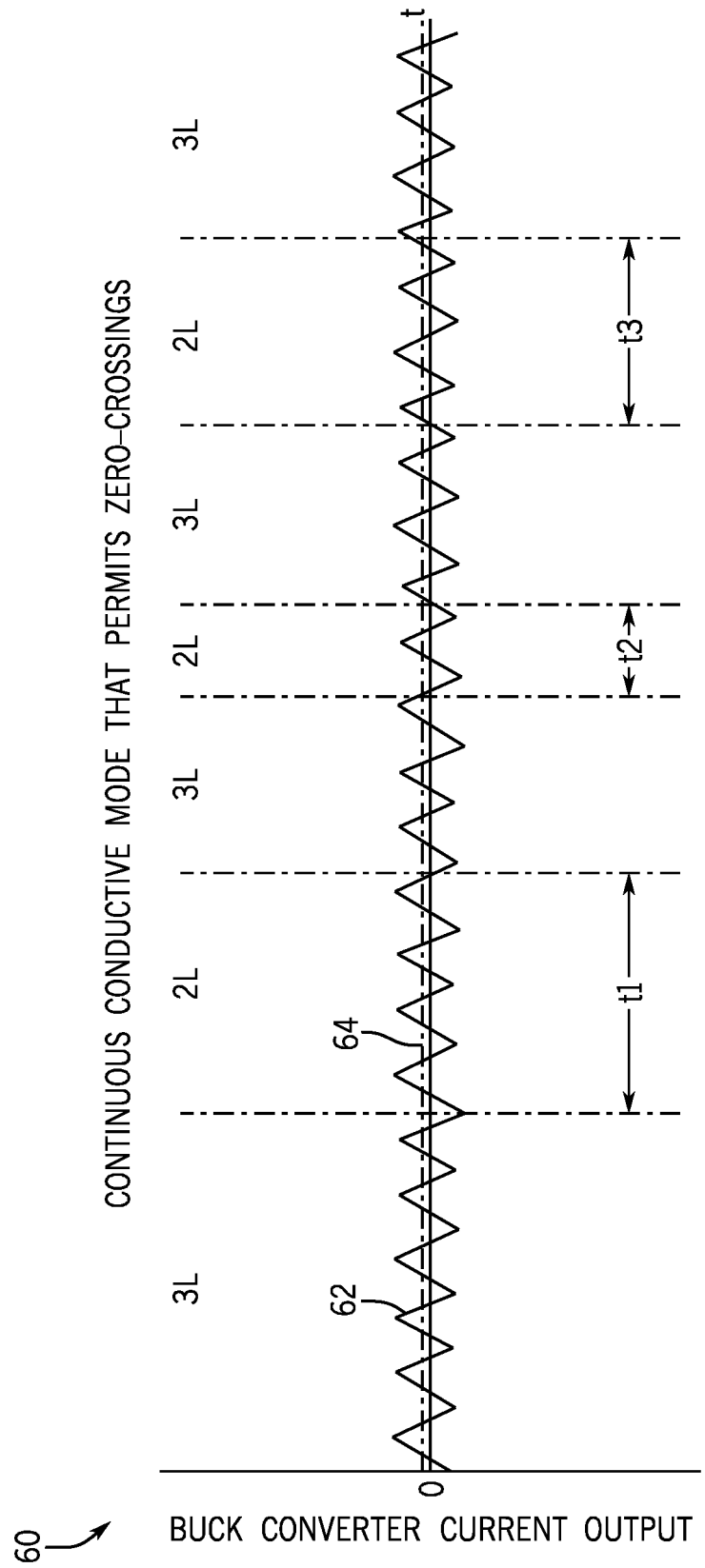
FIG. 7 is a plot of a simulated current output from the buck converter operated by control circuitry in a continuous conduction operation that permits zero-crossing, in accordance with an embodiment.

To help illustrate, FIG. 7 is a plot 60 of a current 62 output simulated over time (t) from a buck converter operated by control circuitry in a continuous conduction operation that permits zero-crossing. Since the current 62 output is not stopped via tristate, the current 62 output corresponds to the inductor current of the buck converter.

The buck converter corresponding to the plot may be simulated to generate a current 62 that corresponds to an inductor current with a zero-crossing and averages overtime to a current value a threshold from 0 A (e.g., indicated via waveform average level 64 that is a relatively small positive value). Although the waveform average level 64 is shown here as a positive average current, it should be understood that a negative average current may be used. The relatively small average current may enable the buck converter to deliver relatively low amounts of power even while maintaining a regulated voltage output. The inductor current, through systems and methods described herein, may cross zero without its corresponding output (as current 62) being stopped, enabling a reduction in switching harmonics introduced relative to discontinuous conduction operations.

Comparing FIGS. 6-7, FIG. 7 includes the same marked periods t1, t2, and t3, where FIG. 7 shows the inductor current 62 as allowed to output and FIG. 6 shows the inductor current 52 as prevented from being output. FIG. 7 also includes designation of a 2-level (2L) mode and a 3-level (3L) mode. By switching between 2L modes and 3L modes as the inductor current 62 drifts to zero, the flycap charging and discharging is able to be controlled even if the direction of the inductor current 62 is unknown (or undetected), enabling more reliable downstream circuitry operation from less noisy supply control. Furthermore, the inductor current 62 output described with FIG. 7 may correspond to an inductor current generated by circuitry of FIG. 8.

Figure 8:
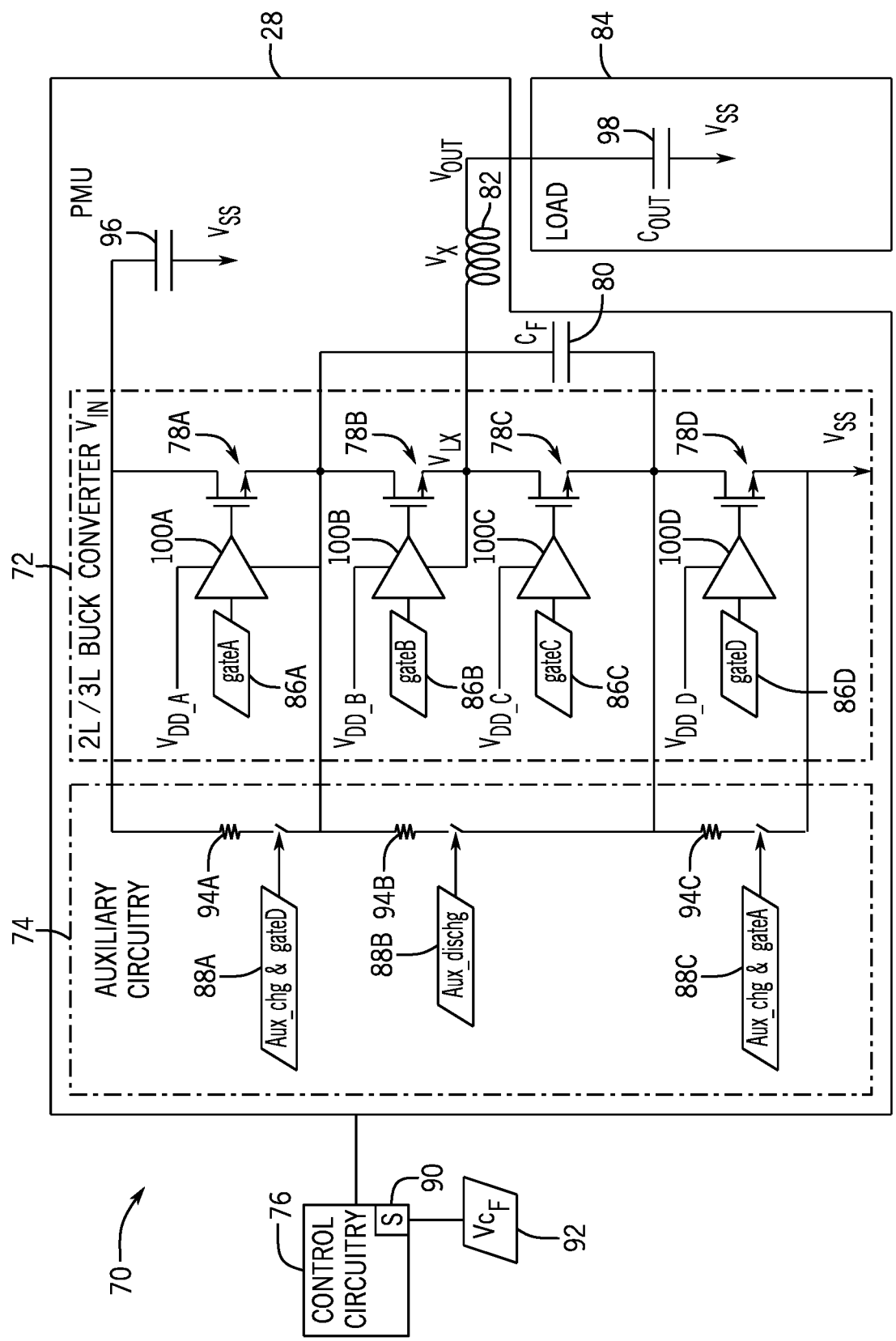
FIG. 8 is a block diagram of circuitry of the buck converter and control circuitry able to operate the buck converter in the continuous conduction operation that permits zero-crossing of FIG. 7, in accordance with an embodiment.

To elaborate, FIG. 8 is a block diagram of a system 70 of the electronic device 10. The system 70 may include, in the PMU 28, a buck converter 72 and auxiliary circuitry 74. The system 70 may include control circuitry 76. The control circuitry 76 may operate the buck converter 72 in the continuous conduction operation that permits zero-crossing of FIG. 7.

The auxiliary circuitry 74 may include circuitry components that enable charging and/or discharging of the flycap 80. The control of the auxiliary circuitry 74 may be based on control of a power bridge and a status of the flycap 80 voltage (e.g., sensed voltage value). In some systems, the auxiliary circuitry 74 may be considered an auxiliary interface, such as an additional portion of circuitry to enable the control circuitry 76 additional control over the buck converter 72. The auxiliary circuitry 74 may include one or more active or passive components, such as one or more resistors, one or more transistors, one or more capacitors, one or more inductors, one or more switches, or the like.

The buck converter 72 may include four switches 78 (switch 78A, switch 78B, switch 78C, switch 78D). The switches 78 may be transistors or any suitable type of switch. Example transistors may include a field effect transistor (FET), a metal-oxide-semiconductor field-effect transistor (MOSFET), bipolar junction transistor (BJT), a junction-gate field-effect transistor (JFET), a PNP transistor, or any suitable transistor. It is noted that circuitry shown in FIG. 8 may be altered based on whether one or more switches 78 are of n-type or p-type.

The buck converter 72 may also include a flying capacitor, CF, (flycap) 80. The flycap 80 may operate as a floating power supply used to regulate its output power. The buck converter 72 may transmit the inductor current and a voltage ($V_{OUT}$) to power a load 84. For example, the output voltage ($V_{OUT}$) from the buck converter 72 may be regulated based on the charge of the flycap 80 that changes the flycap 80 voltage. When the flycap 80 is coupled to the inductor 82, the inductor current may be based on the flycap 80 voltage.

The control circuitry 76 may use combinations of switch 78 to operate the buck converter 72 in a two-level (2L) mode or a 3L mode (e.g., "2L/3L" buck converter). The 2L mode and the 3L mode together may enable continuous conduction of current between the buck converter 72 and the load 84 at any inductor current (including at or near 0 A), as is described herein.

Different combinations of states of the switches 78 may change a direction of an inductor current through an inductor (Lx) 82. Changing the direction of the inductor current may charge or discharge the flycap 80 based on the direction of the inductor current. The power output of the buck converter 72 may be regulated based on changing the charge of the flycap 80, which regulates currents and voltages of nodes of the buck converter 72. The switches 78 and the flycap 80 are may generate.

The control circuitry 76 may generate various control signals 86 to turn on and off pairs of the switches 78 to operate the buck converter 72 into various modes. Control signals 86 may be transmitted to one or more drivers 100 (driver 100A, driver 100B, driver 100C, driver 100D), which may pull up a voltage of the control signal 86 to a suitable voltage (e.g., $V_{DD\_A}$, $V_{DD\_B}$, $V_{DD\_C}$, $V_{DD\_D}$) to turn on or off a respective of the switches 78A-D. The voltages, $V_{DD\_A}$, $V_{DD\_B}$, $V_{DD\_C}$, $V_{DD\_D}$, may be the same voltage or different voltages based on system design and/or material property differences between the respective of the switches 78A-78D. Example modes of the various modes are illustrated in FIGS. 9A-9D.

Figure 9B:
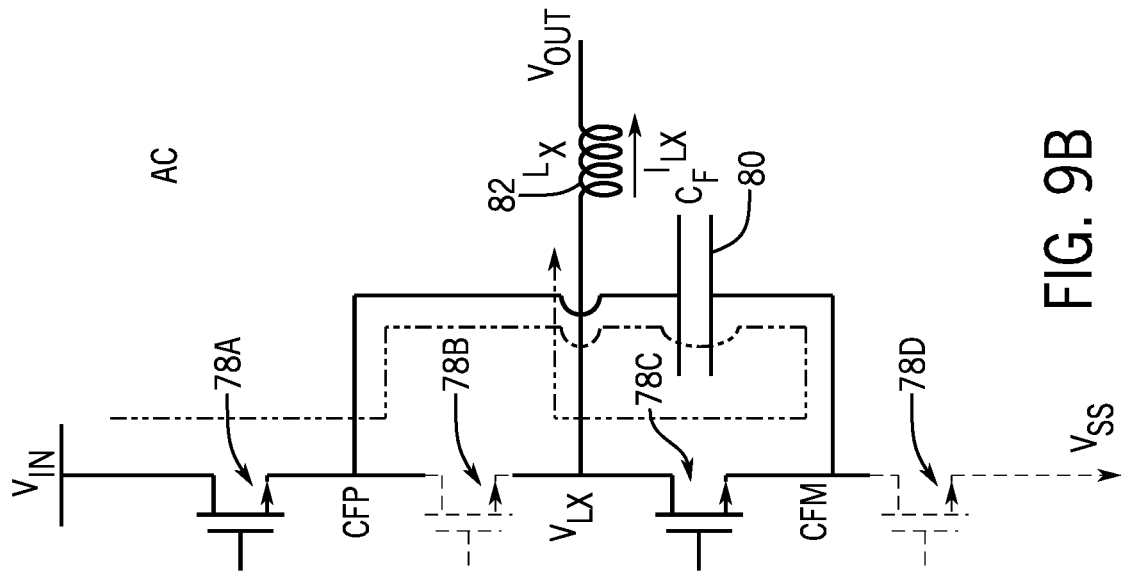
FIG. 9B is a circuit diagram of the buck converter of FIG. 8 in a second mode ("AC mode"), in accordance with an embodiment.
Figure 9A:
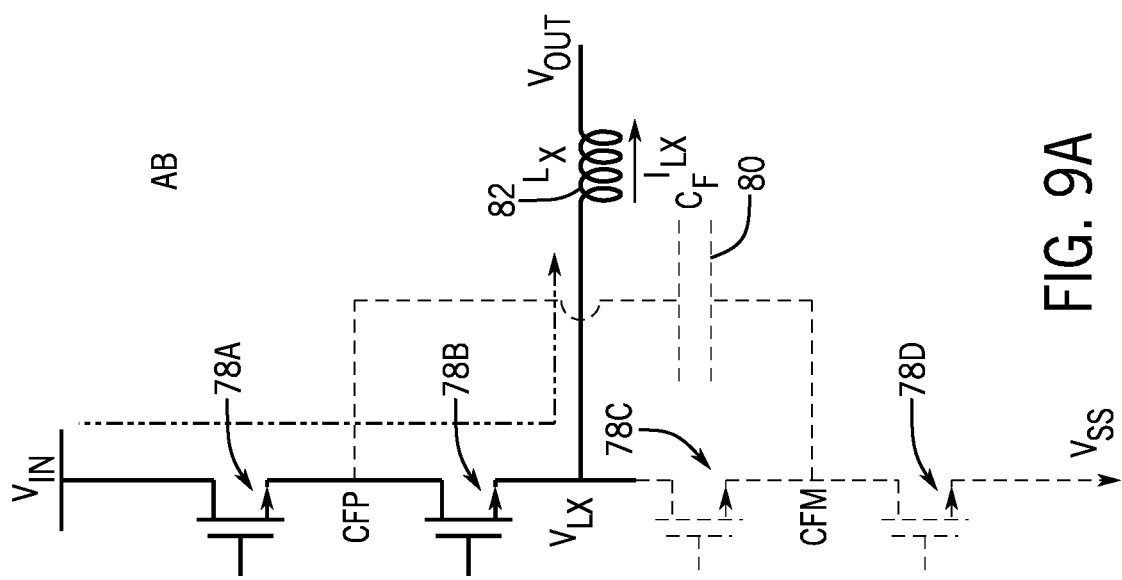
FIG. 9A is a circuit diagram of the buck converter of FIG. 8 in a first mode ("AB mode"), in accordance with an embodiment.
Figure 9D:
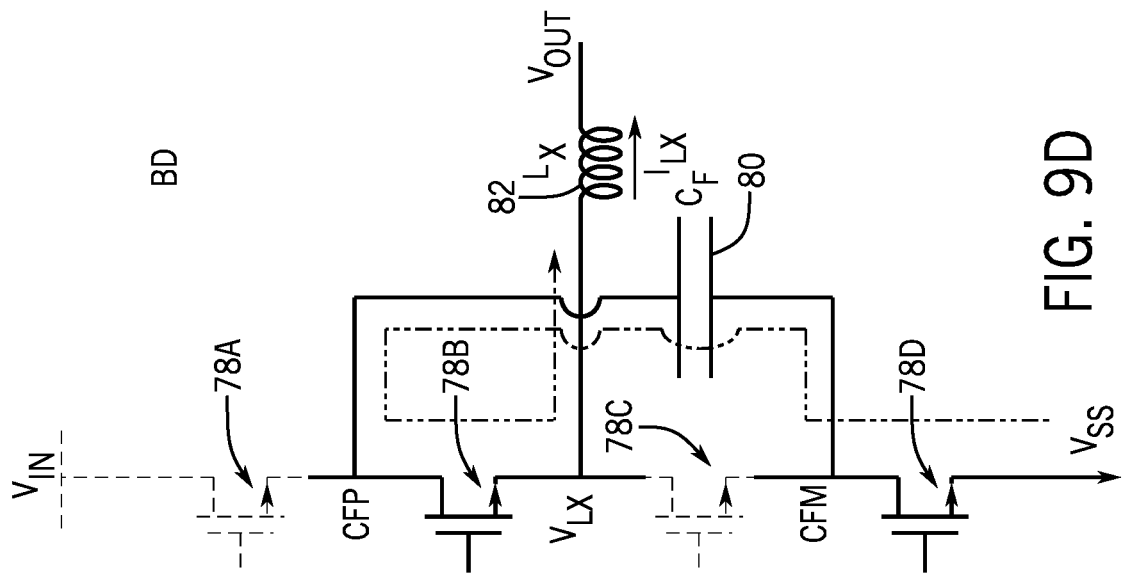
FIG. 9D is a circuit diagram of the buck converter of FIG. 8 in a fourth mode ("BD mode"), in accordance with an embodiment.
Figure 9C:
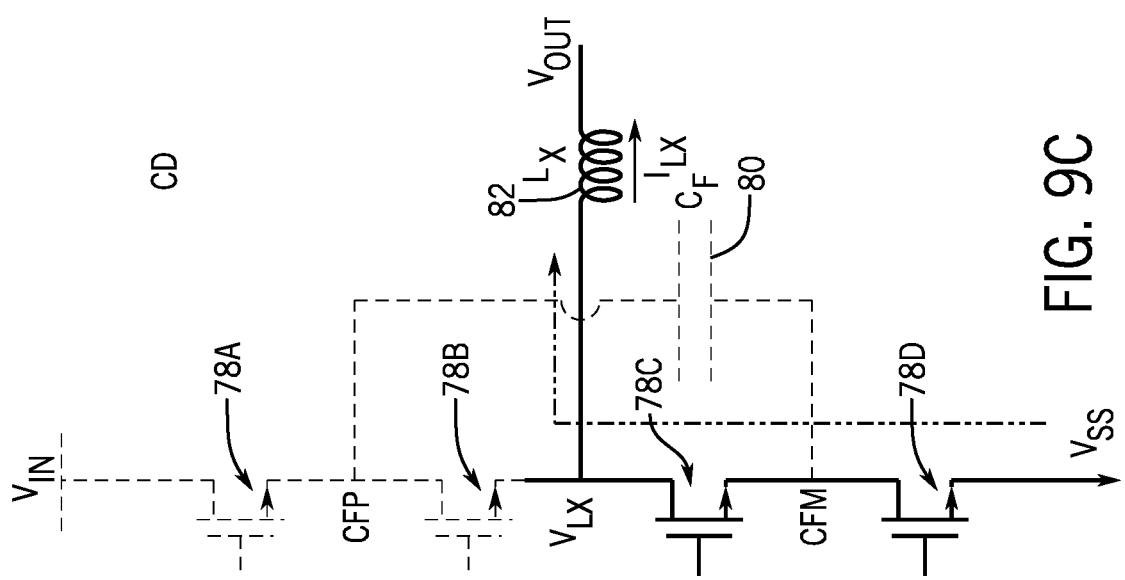
FIG. 9C is a circuit diagram of the buck converter of FIG. 8 in a third mode ("CD mode"), in accordance with an embodiment.

To elaborate, FIG. 9A is a circuit diagram of the buck converter of FIG. 8 in a first mode ("AB mode"). FIG. 9B is a circuit diagram of the buck converter of FIG. 8 in a second mode ("AC mode"). FIG. 9C is a circuit diagram of the buck converter of FIG. 8 in a third mode ("CD mode"). FIG. 9D is a circuit diagram of the buck converter of FIG. 8 in a fourth mode ("BD mode"). For ease of disclosure, FIGS. 9A-9D are described together herein and generally referred to based on the different modes (e.g., AB mode, AC mode, CD mode, BD mode). It is noted that the inductor current 62 output described with FIG. 7 may correspond to the inductor current through the inductor 82 of FIG. 8. As is elaborated on below, the AC mode may charge the flycap 80 and the BD mode may discharge the flycap 80, where the charging or discharging being respectively based on the directionality of the inductor current. The AB mode and the CD mode may not charge or discharge the flycap 80 since the flycap 80 does not transmit the inductor current while in these modes.

In the AB mode, switches 78A and 78B may be closed and switches 78C and 78D may be open. In the AC mode, switches 78A and 78C may be closed and switches 78B and 78D may be open. In the CD mode, switches 78C and 78D may be closed and switches 78A and 78B may be open. In the BD mode, switches 78B and 78D may be closed and switches 78A and 78C may be open. In each of the different modes, the arrows illustrate an inductor current (ILX) generated via the buck converter 72 and transmitted from the inductor 82 as an output current. The various modes may correspond to switch 78 pairs, which when the switches 78 are transistors correspond to transistor pairs.

It is noted that in FIGS. 9A-9D, the dashed arrow in each of the figures corresponds to positive current flow through the respective circuitry. The current flowing corresponds to the inductor 82 current. The inductor current can also flow in the opposite direction. When flowing in the opposite direction, the inductor current is a negative current.

In the AB mode of FIG. 9A, the inductor current transmits from voltage supply ($V_{IN}$) to the inductor 82 via switches 78A and 78B. The inductor current does not transmit through the flycap 80 based on the node CFM being in high impedance from the switches 78C and 78D being off. It is noted that node $V_{LX}$ is labelled as such in FIGS. 9A-9D since a voltage of the node $V_{LX}$ corresponds to the voltage across the inductor 82. Thus, the flycap 80 is not charged or discharged by the inductor current generated by the buck converter 72 while in the AB mode.

In the CD mode of FIG. 9C, the inductor current transmits from voltage supply ($V_{SS}$) to the inductor 82 via switches 78C and 78D. The inductor current does not transmit through the flycap 80 based on the node CFP being in a high impedance based on the switches 78A and 78B being off. Thus, the flycap 80 is not charged or discharged by the inductor current generated by the buck converter 72 while in the CD mode.

In the AC mode of FIG. 9B, the inductor current transmits from voltage supply ($V_{IN}$) to the inductor 82 via switches 78A and 78C. The inductor current transmits through the flycap 80 based on the nodes CFM and CFP having a low impedance path to the supply voltage and inductor voltage (e.g., node $V_{LX}$). Thus, the flycap 80 is charged by the inductor current generated by the buck converter 72 when the inductor current is positive while in the AC mode. However, when the inductor current generated is negative in the AC mode, the flycap 80 is discharged.

In the BD mode of FIG. 9D, the inductor current transmits from voltage supply ($V_{IN}$) to the inductor 82 via switches 78B and 78D. The inductor current transmits through the flycap 80 based on the nodes CFM and CFP having a low impedance path to the ground and inductor voltage (e.g., node $V_{LX}$). Thus, the flycap 80 is discharged by the inductor current generated by the buck converter 72 when the inductor current is positive while in the BD mode. However, when the inductor current generated is negative in the BD mode, the flycap 80 is charged.

In a 3L mode, the buck converter 72 may be operated to change two switch states (e.g., one switch opens and one switch closes). The control circuitry 76 may operate the buck converter 72 into the CD mode, then BD mode, then AB mode, then BC mode, and back to AC mode and repeat with the CD mode. In some cases, the control circuitry 76 is able to switch directly from CD mode to AB mode or vice versa and/or from BD mode to AC mode or vice versa. The control circuitry 76 may change to any of the mode states without first entering into an intermediate switch state. A 2L mode of the buck converter 72 may be based on the CD mode and the AB mode. Since the buck converter 72 can directly enter either of the CD mode or the AB mode from any of the 3L mode switch combinations (e.g., AB mode, AC mode, BD mode, CD mode), the control circuitry 76 may bypass an intermediate state when switching into the 2L mode from the 3L mode. This enables the control circuitry 76 to operate the buck converter 72 in the 2L mode directly from the 3L mode. Being able to change from the 3L mode to the 2L mode without an intermediate state and back to the 3L mode from the 2L without an intermediate state may enable the control circuitry 76 to respond to flycap 80 voltage changes relatively quickly since delay associated with switching into the intermediate state is bypassed.

In a 2L mode, the buck converter 72 may be operated to change four switches at a time (e.g., two switches open and two switches close). The control circuitry 76 may operate the buck converter the control circuitry 76 is able to switch directly between the CD mode and the AB mode. The 2L mode switching may be operated like a larger compounded switch, relative to 3L mode switching operations. The control circuitry 76 may change operation of the buck converter 72 between these mode states without first entering into an intermediate switch state of AC mode or BD mode. This enables the control circuitry 76 to operate the buck converter 72 in the 2L mode directly from the 3L mode. While in the 2L mode, the control circuitry 76 may operate the buck converter 72 repeatedly between the CD mode and the AB mode. In the 2L mode, the charge stored by the flycap 80 may not be charged or discharged by the buck converter 72. This may be caused by the flycap 80 being electrically isolated from the inductor current while the buck converter 72 is operated in either the CD mode and AB mode. Since the 2L mode involves operationally switching between the CD mode and the AB mode, the flycap 80 may be electrically isolated from the inductor current while the buck converter 72 is in either the CD mode or the AB mode.

In any of these modes, one switch may open at an at least partially overlapping time during to another switch closing to implement the mode change. Non-overlapping switching times may be used in some cases.

Referring now to FIGS. 9A-9D in parallel with FIG. 8, while the control circuitry 76 operates the buck converter 72 in the 2L mode to switch between the CD mode and the AB mode, the flycap 80 is isolated from the inductor 82. The control circuitry 76 may operate the buck converter 72 into the 2L mode when the control circuitry 76 determines that the flycap 80 is to have its stored charge regulated to change the voltage across the flycap 80. The control circuitry 76 may operate the buck converter 72 to be in a same output mode with a same switching frequency, as seen by the load 84, without going to idle due to the additional 2L mode states and due to the ability to transition from the 2L mode states to the 3L mode states directly (bypassing the intermediate state) once the flycap 80 returns to desired voltage (e.g., returns to regulation).

To elaborate, the control circuitry 76 may receive, via a sensor 90, sensed data 92 that indicates a charge at a time of sensing of the flycap 80. The sensor 90 may be any suitable sensing circuitry, such as a voltage sensing circuit coupled in parallel with the flycap 80 to acquire a signal indicative of the voltage across contacts of the flycap 80. The sensed data 92 may indicate the voltage across the flycap 80 at the time of sensing.

The control circuitry 76 may compare the sensed data 92 to an indication of a target voltage value (e.g., a voltage set point). The control circuitry 76 may determine that the sensed data 92 crosses a threshold value. By making this determination, the control circuitry 76 may detect when the voltage output from the buck converter 72 is out of regulation independent of the direction of the inductor current (e.g., without determining the direction of the inductor current). The control circuitry 76 may respond by operating the buck converter 72 from the 3L mode into the 2L mode.

The 2L mode may isolate the flycap 80 from the inductor current while still enabling the flycap 80 to provide over voltage protection. Referring briefly to FIG. 8, the control circuitry 76 may adjust the flycap 80 voltage, via the auxiliary circuitry 74, without affecting the inductor current supplied to the load 84. As shown in FIG. 8, the control circuitry 76 may generate one or more control signals 88 (control signal 88A, control signal 88B, control signal 88C) to operate switches 102 (switch 102 A, switch 102B, switch 102C) of the auxiliary circuitry 74. The auxiliary circuitry 74 may include resistors 94 (resistor 94A, resistor 94B, resistor 94C). The switches 102 A and 102C, when enabled by the control circuitry 76 via the control signals 88A and 88C, may cause the auxiliary circuitry 74 to charge the flycap 80. When the switches 102 A and 102C are closed and the switch 102B is open, the voltage supply ($V_{IN}$) may electrically couple to the flycap 80 to cause a charging current to transmit through the flycap 80. The switch 102B, when enabled by the control circuitry 76 via the control signal 88B, may cause the auxiliary circuitry 74 to discharge the flycap 80. When the switch 102B is closed and the switches 102 A and 102C are open, the flycap 80 may discharge based on the resistor 94B without being coupled to the voltage supply ($V_{IN}$). The auxiliary circuitry 74 may include other components than those depicted in FIG. 8, for example capacitors, inductors, resistors, voltage sources, switches, or the like, may be included.

When the control circuitry 76 determines that the sensed data 92 indicates the flycap 80 voltage is within regulation (e.g., within threshold range of deviation from a target threshold voltage), the control circuitry 76 may change the operation of the buck converter to return to the 3L mode. Being able to change from the 3L mode to the 2L mode without an intermediate state and back to the 3L mode from the 2L without an intermediate state may enable the control circuitry 76 to respond to changes in the flycap 80 voltage relatively quickly since delay associated with switching into the intermediate state is bypassed.

It is noted that the resistors 94, capacitor 96, and/or capacitor 98 may represent one or more system 70 and/or load 84 impedances, such as transmission path impendences or other impedances associated with the system 70. The capacitors 96 and 98 may respective have two terminals or plates that connect to respective nodes associated with the buck converter 72. Capacitor 96 may store a charge based on the input voltage ($V_{IN}$) to the buck converter 72 and ground voltage ($V_{SS}$). Capacitor 98 may store a charge based on the output voltage ($V_{OUT}$) from the buck converter 72 and ground voltage ($V_{SS}$).

Figure 10:
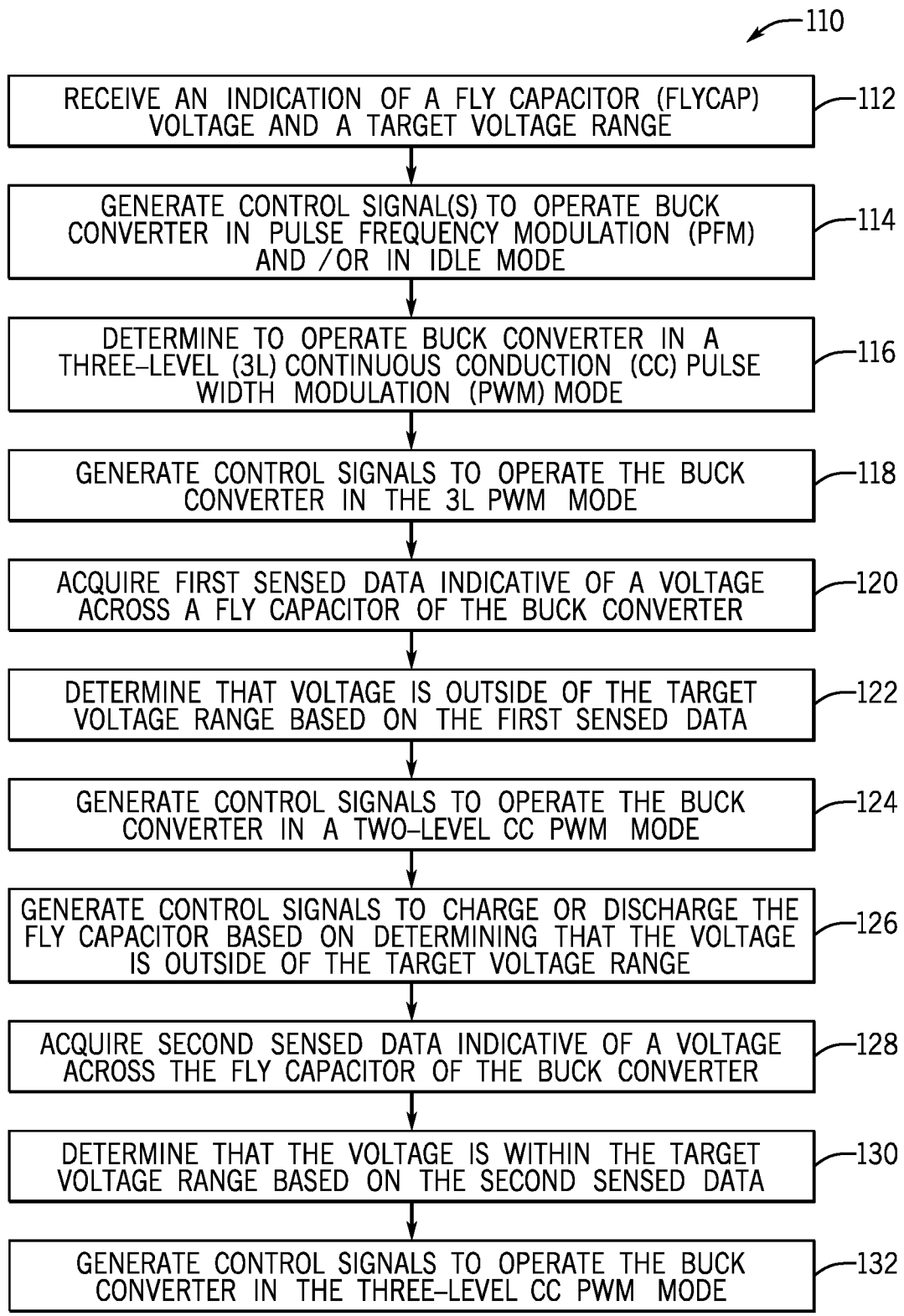
FIG. 10 is a flowchart of a method performed by the control circuitry of FIG. 8 to operate the buck converter of FIG. 8 in the continuous conduction operation that permits zero-crossing of FIG. 7, in accordance with an embodiment.

As an example of these regulation operations, FIG. 10 is a flowchart of a method 110 performed by the control circuitry 76 to operate the buck converter 72 in the continuous conduction operation that permits zero-crossing of FIG. 7. Any suitable device (e.g., a controller) that may control components of the electronic device 10, such as the processor core complex 18, may perform the method 110. In some embodiments, the method 110 may be implemented by executing instructions stored in a tangible, non-transitory, computer-readable medium, such as the memory 20 or storage device 22, using the processor core complex 18 and/or a processor of the control circuitry 76. For example, the method 110 may be performed at least in part by one or more software components, such as an operating system of the electronic device 10, one or more software applications of the electronic device 10, and the like. While the method 110 is described using steps in a specific sequence, it should be understood that the present disclosure contemplates that the described steps may be performed in different sequences than the sequence illustrated, and certain described steps may be skipped or not performed altogether.

At block 112, the control circuitry 76 may receive an indication of a target voltage of the flycap 80 (e.g., voltage set point) and a target voltage range (e.g., voltage operating range). The target voltage range may indicate a target range of voltages that the flycap 80 is to be operated within while operating the buck converter 72. The indications of voltages may correspond to a current operational mode that the electronic device 10 is to be operated within, such as an always-on display mode, a powered off mode, a normal mode, or the like.

At blocks 114-118, the control circuitry 76 may control operation of the buck converter 72 based on the indication of the flycap 80 voltage and the indication of the target voltage range. The control circuitry 76 may generate one or more control signals 86, 88 to operate the buck converter 72 to discharge and charge the flycap 80 voltage as long as the voltage is within the target voltage range. These control operations may involve the control circuitry 76, at block 114, generating one or more control signals to operate the buck converter 72 to generate pulse frequency modulation (PFM) outputs. The control circuitry 76 may generate one or more control signals to start operation of the buck converter 72, transitioning it out of an idle mode that had stopped output. At block 116, the control circuitry 76 may determine to operate the buck converter 72 in a three-level (3L) continuous conduction (CC) pulse width modulation (PWM) mode. This determination may be based on the control circuitry 76 receiving an indication of the flycap 80 voltage that would correspond to the buck converter 72 generating an inductor current with a zero-crossing. At block 118, the control circuitry 76 may generate one or more control signals to operate the buck converter 72 in the 3L PWM mode. These control signals may correspond to control signals 86, which correspond to operating the buck converter 72 in one of the AB mode, BC mode, AC mode, or BD mode of FIGS. 9A-D. The control circuitry 76 may continue to generate the various control signals 86 to operate the buck converter 72 between the various 3L modes. Some or all operations of blocks 114-118 may correspond to controlling, via control circuitry 76, a multi-level buck converter to supply an output voltage to a load 84, where the multi-level buck converter comprises a capacitor. Indeed, supplying the output voltage to the load 84 may involve being in the PFM mode and the PWM mode.

At block 120, the control circuitry 76 may acquire, via the sensor 90, first sensed data (e.g., the sensed data 92 at a first time) indicative of a voltage across the flycap 80 of the buck converter 72. At some point during operation, the control circuitry 76 may confirm whether the flycap 80 voltage is within regulation according to the indications received at block 112. The control circuitry 76 may confirm the regulation of the flycap 80 voltage at a sensing interval (e.g., once every minute, once every sensing interval, once every ten seconds). The sensing interval may be stored in memory and read by the control circuitry 76. The control circuitry 76 may change the sensing interval in response to determining that the sensed flycap 80 voltage is a threshold from crossing the target voltage range (e.g., being out of range, 1%, 0.05%, 5% or any suitable threshold from being out of the target voltage range, 1V from crossing the target voltage range or any suitable voltage threshold).

At block 122, the control circuitry 76 may determine that the sensed flycap 80 voltage is outside of the target voltage range based on comparing the first sensed data (e.g., the sensed data 92 at a first time) to the target voltage range and/or the indication of the target voltage. The control circuitry 76 may compare the first sensed data to the indication of the flycap 80 voltage. If the first sensed data is not equal to the flycap 80 voltage, the control circuitry 76 may compare the first sensed data to the target voltage range and determine whether the first sensed data is outside the target voltage range. The control circuitry 76 may do so based on the comparing (e.g., in response to the first sensed data being greater than the flycap 80 voltage) an upper limit of the target voltage range to the first sensed data and determining whether the first sensed data exceeds the upper limit and/or based on comparing (e.g., in response to the first sensed data being less than the flycap 80 voltage) a lower limit of the target voltage range to the first sensed data and determining whether the first sensed data is less than the lower limit. Basing the comparison of the first sensed data to the target voltage range on whether the first sensed data is less than or greater than the flycap 80 voltage may save one or more clock cycles of computation (e.g., be faster) based on eliminating one or more of the determination operations relative to checking both upper and lower limits each time.

In response to determining that the first sensed data is outside the target range of flycap 80 voltages, at block 124, the control circuitry 76 may generate one or more control signals to operate the buck converter 72 in a two-level (2L) CC PWM mode corresponding to the AB mode and the CD mode of FIGS. 9A and 9C. While the buck converter 72 is in the 2L mode, the control circuitry 76 may continue to generate the control signals 86 to main the buck converter 72 in the 2L mode. The operations of block 124 may correspond to determining, via the control circuitry 76, that a voltage of the capacitor (e.g., flycap 80) crosses a threshold voltage and isolating, via the control circuitry 76, the capacitor (e.g., flycap 80) from the load 84 based on the voltage of the capacitor (e.g., flycap 80) crossing the threshold voltage. By operating the buck converter 72 in the 2L mode, the flycap 80 may not have the inductor current transmitted through it. This may enable the control circuitry 76 to regulate, via the auxiliary circuitry 74, the flycap 80 voltage without affecting operation of the load 84.

Furthermore, while the buck converter 72 is in the 2L mode, at block 126, the control circuitry 76 may generate one or more control signals 88 to charge or discharge the flycap 80 based on determining that the voltage is outside of the target voltage range. The control circuitry 76 may determine one or more adjustments to apply to the flycap 80 voltage to bring it within regulation (e.g., target voltage setpoint and target voltage range received at block 112). The adjustment may involve operating one or more switches of the auxiliary circuitry 74 to discharge or charge the flycap 80 based on a difference between the voltage setpoint and the flycap 80 voltage. The control circuitry 76 may determine an amount by which to discharge the flycap 80 or an amount by which to charge the flycap 80. The control circuitry 76 may adjust the flycap 80 voltage after the flycap 80 voltage is outside the target voltage range received at block 112. In this way, the flycap 80 voltage may drift some and be stopped before drifting beyond the permissible range. Operations of block 126 may correspond to adjusting, via the control circuitry 76, the voltage of the capacitor (e.g., flycap 80) after the capacitor (e.g., flycap 80) is electrically isolated from the load 84.

After the control circuitry 76 operates the auxiliary circuitry 74 to charge or discharge the flycap 80, at block 128, the control circuitry 76 may acquire, via the sensor 90, second sensed data (e.g., the sensed data 92 at a second time after the first time) indicative of a voltage across the flycap 80 of the buck converter 72. At block 130, the control circuitry 76 may determine that the sensed flycap 80 voltage is within the target voltage range based on comparing the second sensed data (e.g., the sensed data 92 at the second time) to the target voltage range and/or the target voltage. Operations of blocks 128 and 130 may correspond to determining, via the control circuitry 76, that the voltage of the capacitor (e.g., flycap 80) is within a target voltage range.

In response to the sensed flycap 80 voltage having returned to being in regulation, the control circuitry 76, at block 132, may generate control signals to operate the buck converter 72 to return to the 3L CC PWM mode. Operations of block 132 may correspond to controlling, via the control circuitry 76, the buck converter 72 to electrically couple the capacitor (e.g., flycap 80) to the load 84 based on the voltage of the capacitor (e.g., flycap 80) being within the target voltage range.

Blocks 120-132 may correspond to incremental adjustments. In some cases, the control circuitry 76 implements the adjustment incrementally. Thus, the control circuitry 76 may determine one or more adjustments to apply to change the voltage to the target voltage over time (e.g., via multiple sensing and adjustment repeated operation).

Figure 11:
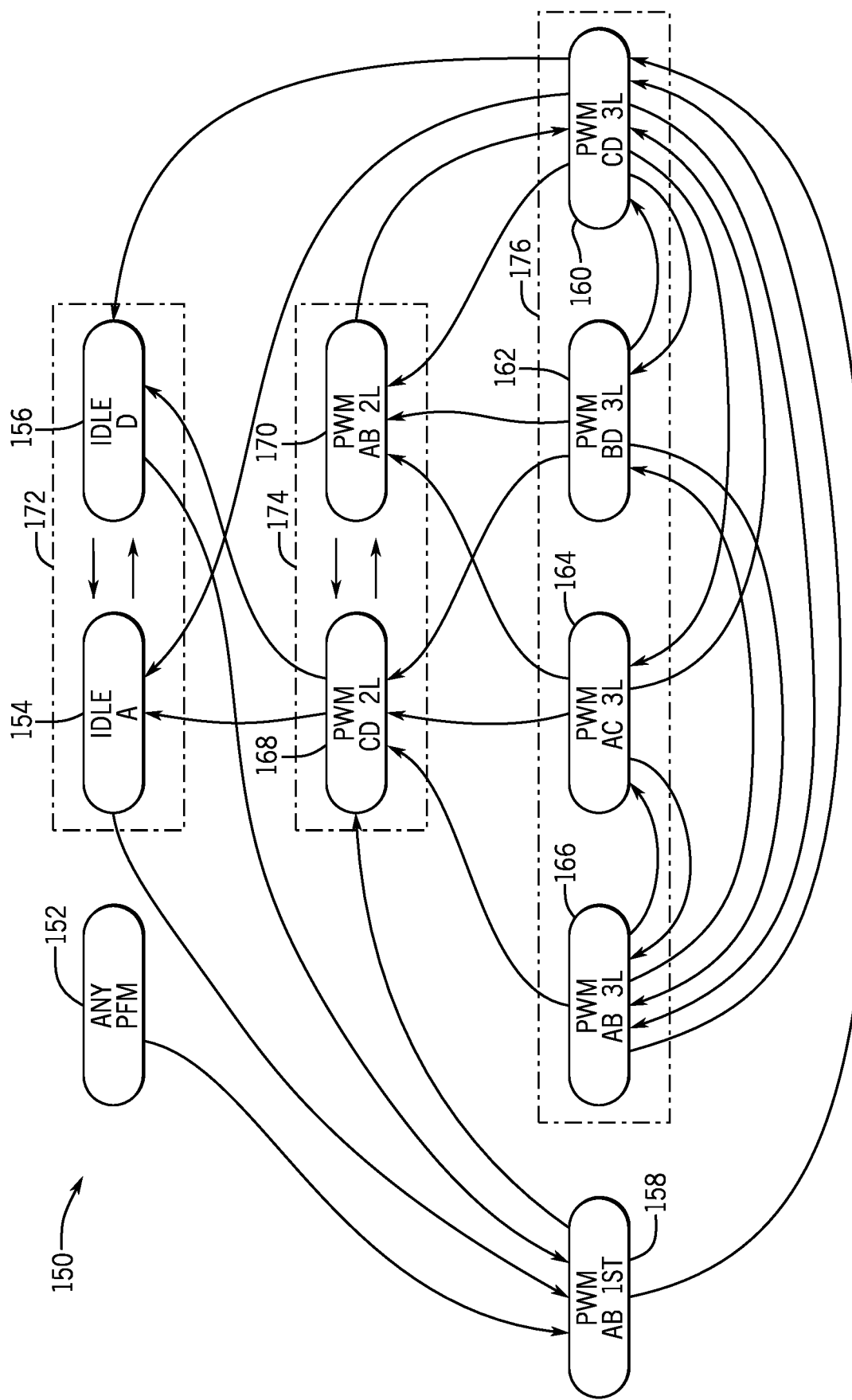
FIG. 11 is a diagrammatic representation of a state diagram of operations of the buck converter of FIG. 8 when being operated in the continuous conduction operation that permits zero-crossing of FIG. 7, in accordance with an embodiment.

The 3L CC PWM mode and the 2L CC PWM mode discussed with reference to FIG. 10 may be illustrated in FIG. 11. FIG. 11 is a diagrammatic representation of a state diagram 150 of operations of the buck converter 72 when being operated in the continuous conduction operation that permits zero-crossing of FIG. 7. The state diagram includes indications of operational states as state blocks 152-170. States 172 correspond to idle states, where the inductor current may not be generated nor output from the buck converter 72. States 174 correspond to 2L mode states, where the inductor current may be generated based on the control circuitry 76 operating the buck converter 72 to open and close pairs of switches 78 (e.g., paired switch 78A and 78B, paired switches 78C and 78D), as if a combination switch. States 176 correspond to 3L mode states, where the inductor current may be generated based on the control circuitry 76 operating the buck converter 72 into the different states 160-166 by opening and closing individual switches 78 over time as opposed to a combination switch.

The control circuitry 76 may operate the buck converter 72 in any of the states 172 or the state 152 corresponding to any pulse frequency modulation operation. Operations of block 114 may correspond to these operations.

From either of those states 152, 154, 156, the control circuitry 76 may operate the buck converter 72 to a first AB mode (e.g., AB mode of FIG. 9A) of state 158. The state 158 enables subsequent transition directly to a respective of the states 174 (e.g., 2L mode) or the states 176 (e.g., 3L mode) without an additional intermediate state. From the state 158, the control circuitry 76 may operate the buck converter 72 to the 3L mode states 176. Operations of block 116-118 may correspond to these operations. To operate in the 3L mode states 176, the control circuitry 76 may repeatedly generate various combinations of control signals 86 to operate the various switches 78 into the different 3L modes of FIGS. 9A-9D. AB mode of FIG. 9A corresponds to AB 3L mode of state 166. AC mode of FIG. 9B corresponds to AC 3L mode of state 164. CD mode of FIG. 9C corresponds to CD 3L mode of state 160. BD mode of FIG. 9D corresponds to BD 3L mode of state 162. The state diagram 150 illustrates example transitions between the various 3L modes of states 176. Operations of blocks 120 and 122 may occur in parallel with transitions between the various 3L modes of states 176.

At some time, the control circuitry 76 may decide to operate the buck converter 72 in a respective 2L mode state of the states 174. This may correspond to operations of block 122. The operations of block 124 correspond to the control circuitry 76 generating one or more control signals 86 to operate the buck converter 72 from a respective 3L mode state of the states 176 into a respective 2L mode state of the states 174. As indicated in the state diagram 150 and described above, no intermediate state may be used when transition from 3L mode to 2L mode. Indeed, the control circuitry 76 may directly transition the buck converter 72 to the 2L mode from the 3L mode (and later back again to the 3L mode or to one of the states 172). While in the 2L mode, the control circuitry 76 may perform operations of block 126, 128, and 130.

The control circuitry 76 may control the buck converter 72 from a respective 3L mode of the states 174 into a respective 3L mode of the states 176 (e.g., operations of block 132). Indeed, the control circuitry 76 may directly transition the buck converter 72 to the 3L mode from the 2L mode. Operations of method 110 may be repeated via the control circuitry 76 to continue regulating power supplied via the buck converter 72 based on operating in and out of the 2L mode or 3L mode over time, as illustrated based on the state diagram 150.

Figure 12:
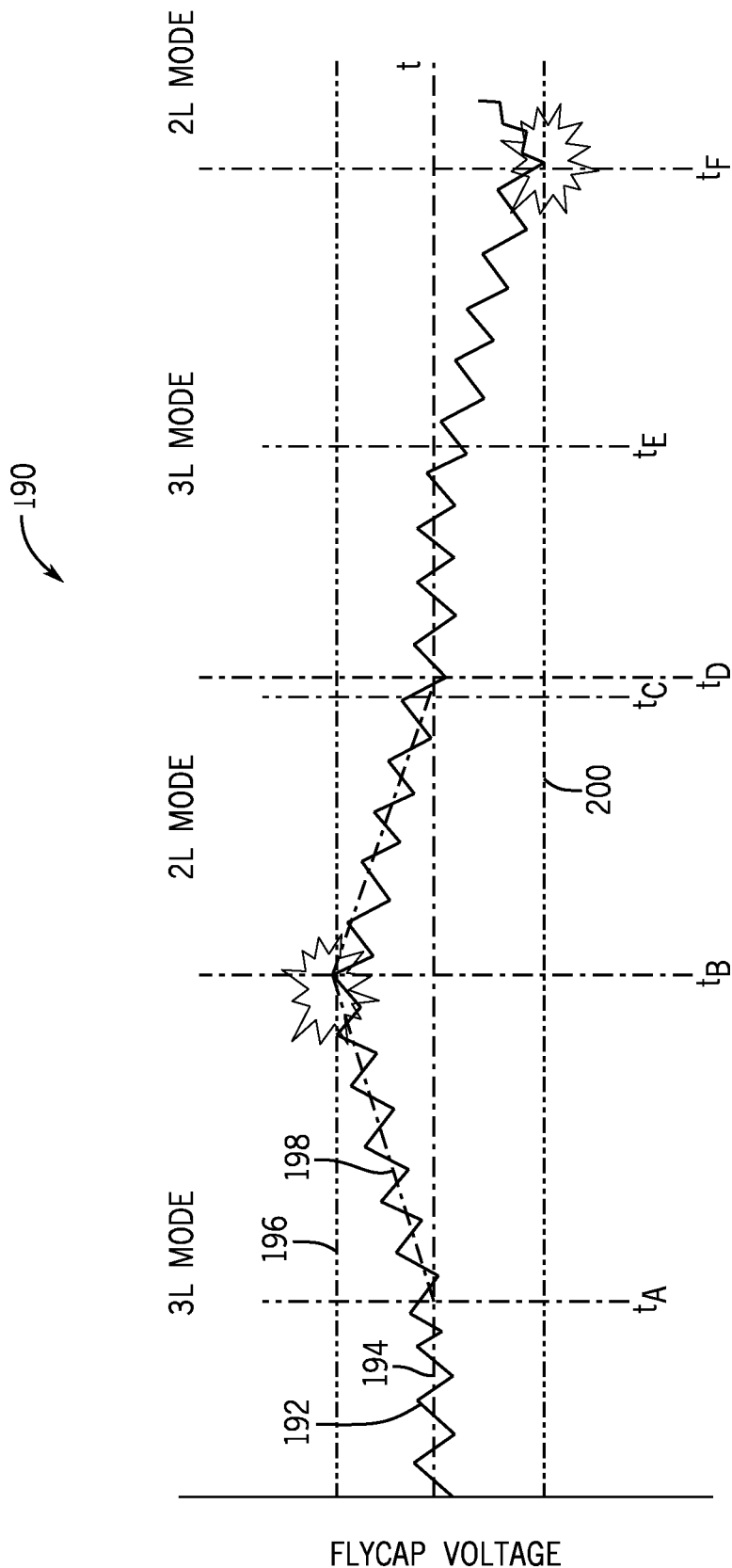
FIG. 12 is a plot of a simulated voltage of a fly capacitor (flycap) of the buck converter of FIG. 8 while the buck converted is operated in the continuous conduction operation that permits zero-crossing of FIG. 7, in accordance with an embodiment.

With the foregoing in mind, FIG. 12 is a plot 190 of a simulated voltage 192 of the flycap 80 over time (e.g., voltage waveform). The control circuitry 76 may control the buck converter 72 based on three regulation target voltage levels—a target voltage level 194, an upper threshold level 196, and a lower threshold level 200. The setpoint voltage level corresponding to the flycap 80 may be represented on the plot 190 as target voltage level 194. The voltage 192 waveform is depicted in FIG. 12 with regulating target-crossings. The buck converter 72 may be operated in the continuous conduction operation that permits zero-crossing of FIG. 7 (e.g., while operated in accordance with operations of method 110) when the voltage 192 was simulated. As described herein, the control circuitry 76 may monitor the flycap 80 voltage and control the buck converter 72 in a 3L mode (e.g., between various states 176) or a 2L mode (e.g., between states 174) based on the monitored flycap 80 voltage.

The voltage 192 may correspond to the voltage across the flycap 80. The voltage 192 may be regulated by the control circuitry 76 in accordance with the target flycap 80 voltage and target voltage range received at block 112 of method 110. Between time=0 and time=$t_A$, the voltage 192 averages to X, a positive non-zero voltage value equals the target voltage level 194 that may involve a zero-crossing (depending on the value of the target voltage level 194). At time=$t_A$ the voltage 192 (e.g., average 198 of the waveform) beings to drift from the target voltage level 194. The control circuitry 76 may continue to operate the buck converter 72 in the 3L mode (e.g., between respective states 176) until the voltage 192 equals and/or crosses an upper threshold level 196. The upper threshold level 196 may correspond to the target voltage range associated with block 112.

At time=$t_B$, the control circuitry 76 may operate the buck converter 72 in the 2L mode (e.g., between respective states 174) to decouple the flycap 80 from the inductor 82 and enable regulation of the flycap 80 voltage to return within the target voltage range, as described above with operations of blocks 120-130. Regulation of the flycap 80 voltage occurs while the buck converter 72 is in the 2L mode between time=$t_B$ and time=$t_D$. Between time=$t_B$ and time=$t_D$, corrections may be implemented to reduce an average of the voltage 192 over time.

At time=$t_C$, the control circuitry 76 determines that the voltage 192 is within the target voltage range based on sensed data (e.g., operations of block 130) and generates control signals to operate the buck converter 72 into the 3L mode (e.g., operations of block 132).

Between time=$t_D$ and time=$t_E$, the control circuitry 76 operates the buck converter 72 in the 3L mode and the average of the voltage 192 is within regulation and/or equals the target voltage level 194 from block 112. The voltage 192 here corresponds to the positive non-zero voltage value that involves zero-crossings. At time=$t_E$, the average 198 of the voltage 192 begins to drift negative. At time=$t_E$, the control circuitry 76 determines that the average of the voltage 192 crosses a lower threshold level 200. The 2L mode is once again used to isolate the flycap 80 from the load 84 and the control circuitry 76 is able to adjust the flycap 80 voltage within regulation without affecting operations of the load 84 and/or introducing additional switching harmonics since the power delivered to the load 84 may be undistributed by changing between the 2L and 3L modes.

The control circuitry 76 may control one or more buck converters 72. Thus, operations of FIG. 10 may be performed in parallel at different times for different buck converters 72 powering different loads 84.

In some systems, the electronic device 10 may be operated in various operational modes, such as an always-on display mode, a power off mode, a reduced power mode, and a normal mode, among others. These different operational modes may consume different amounts of power, which may lead to the power converter circuits associated with the PMUs 28 changing in operation to supply power while in the various operational modes. Through the controlled operations of the power converters, circuits of the electronic device 10 may receive different amounts of power corresponding to the different operational modes. For example, the control circuitry 76 may control a buck converter 72 to change a power supplied via a power rail to an integrated circuit being operated into a different operational mode. In one example operational mode, the integrated circuit may be operated in a low power mode. Similar to a power off mode, the PMU 28 may stop supplying power to one or more portions of the electronic device 10 while operated in the low power mode. With this in mind, entering the low power mode may entail reducing power supplied to one or more power rails. To operate the buck converter 72 to supply a different amount of power, control circuitry 76 may control the buck converter in the continuous conduction operation using systems and methods described herein to generate a negative current or a positive current, even as the generated current is around 0 A.

In some cases, different sub-systems of the electronic device 10 may be operated into different operational modes at a same time. In this way, a display 12 may be operated in an always-on display mode that corresponds to the image processing circuitry being in a powered off mode or a reduced power mode. Any suitable number of operational modes that combine reduced power mode, normal power modes, power off modes, or the like may be used, including power modes that power to different supply levels. The processor core complex 18 may transmit an indication of the operational mode to be implemented to the control circuitry 76. In response, the control circuitry 76 may read indications of voltages (e.g., indication of the voltage of the flycap 80 and the target voltage range) from memory based on the indication of the operational mode, an identifier of the 3L buck converter, the load 84, or the like. For example, a reduced power mode of a first sub-system may correspond to less power than a reduced power mode of a second sub-system and thus the control circuitry 76 may receive a different, lower indication of voltage of the flycap 80 when the load 84 is in the first sub-system relative to when the load 84 is instead in the second sub-system.

As noted above, around 0 A may refer to an output that involves a zero-crossing, an output that is suitably close to 0 A to be unreliable based on material properties, circuitry, and/or system design, or the like of that specific buck converter. These systems and methods may be used to generate the relatively small average inductor currents around 0 A that enable the low power mode described above. The average inductor current being around 0 A may correspond to an average inductor current of between 0 milliamps (mA) and 10 mA, 5 mA and 50 mA, 10 mA and 100 mA, 0.01 mA and 100 mA, 0 mA and 500 mA, or the like. Indeed, any suitable range with a zero-crossing in the inductor current waveform may be used.

Technical effects described herein include systems and methods that enable regulation of a three-level (3L) buck converter output around zero. Around zero may refer to an output that involves a zero-crossing, an output that is close to zero, or the like, where is close to zero means close enough to zero to be unreliable based on material properties, circuitry, and/or system design, or the like of that specific buck converter. A 3L buck converter operates based on a direction of a current generated between switches of the 3L buck converter. Current direction may become unpredictable or immeasurable around zero or when the waveform has a zero-crossing. For example, although an AC mode can be used to charge a flying capacitor (flycap) of the buck converter, when the inductor current generated is opposite in direction as to what control circuitry was expecting, the AC mode can discharge the flycap. Unexpected discharging or charging of the flycap may lead to power generated being out of regulation with target power to be supplied to a load. Described herein are control circuitry systems and methods that selectively switch the 3L buck converter between 2L modes and 3L modes to regulate the voltage output even if the inductor current is around zero (e.g., a relatively low average current target, includes a zero-crossing in its waveform, a threshold range from 0 A). Systems and methods described herein may compensate for flycap charge drift even with current direction detection being ambiguous when the output generated is around zero by using operating ranges to determine when to isolate the flycap from the load for charge regulation via an auxiliary circuit. By using these systems and methods herein, an output from buck converter may be regulated to a target output level (e.g., current, voltage, power) using continuous conduction operation that maintains a constant switching frequency without operating the output into tristate even if the output level is close to zero.

Furthermore, by using these systems and methods, a 3L buck converter may be used to replace a buck converter, such as in applications where the fixed frequency, low ripple on output, and controlled regulation when load is low are desired. Systems and methods described herein may be used to detect, as described, when the voltage of the flycap crosses a threshold. Thus, systems and methods may be used to control operation of a downstream circuit that operates based on the flycap voltage and/or the output from the 3L buck converter. The systems and methods of this disclosure may enable output overload and/or current limit detection corresponding to the connected load. In the event that the current limit is detected, the described 3L buck converter may be responsively switched into an alternative state of the state diagram without an intermediate state. For example, the control circuitry may operate the 3L buck converter from the 3L mode to the 2L mode or to one of the idle states to not overload the connected load. Furthermore, the systems and methods of this disclosure may bootstrap voltages when crossing a threshold. For example, the switches of the 3L buck converter may use bootstrap control drivers. The 2L mode may be used to recover in less time from a bootstrap condition since in the 2L mode each of the four switches are turned on at some point during a clock period. In contrast, the 3L mode may leave some of the four switches off or unswitched over a clock period. Thus, the 2L mode may enable switch refreshing to occur in less than when in bootstrap condition relative using the 3L mode to switch refresh.

Examples described herein relate to PMUs and buck converters of the PMUs. It should be understood that buck converter systems and methods described herein may be applied to various circuitries within the electronic device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Moreover, techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A system, comprising:
a buck converter configured to power a load, wherein the buck converter comprises a capacitor;
auxiliary circuitry coupled to the capacitor; and
control circuitry configured to couple to the buck converter and the auxiliary circuitry, wherein the control circuitry is configured to:
determine that a voltage of the capacitor crosses a threshold voltage;
control the buck converter to isolate the capacitor from a current configured to be delivered to the load based on the voltage of the capacitor crossing the threshold voltage; and
control the auxiliary circuitry to adjust the voltage of the capacitor based on the capacitor being isolated from the current.

2. The system of claim 1, wherein the control circuitry is configured to:
determine that the voltage of the capacitor is within a target voltage range; and
control the buck converter to electrically couple the capacitor to the current based on the voltage of the capacitor being within the target voltage range.

3. The system of claim 1, wherein the buck converter comprises a plurality of transistors comprising a first transistor, a second transistor, a third transistor, and a fourth transistor, wherein the first transistor and the second transistor are coupled to form a first node, wherein the second transistor and the third transistor are coupled to form a second node, wherein the third transistor and the fourth transistor are coupled to form a third node.

4. The system of claim 3, wherein the control circuitry is configured to operate the buck converter into different modes based on respective transistor pairs of the plurality of transistors being turned on at a same time, wherein the different modes comprise an AB mode, a BD mode, a CD mode, and an AC mode, and wherein:

the AB mode corresponds to the first transistor being on and the second transistor being on, the BD mode corresponds to the second transistor being on and the fourth transistor being on, the CD mode corresponds to the third transistor being on and the fourth transistor being on, and the AC mode corresponds to the first transistor being on and the third transistor being on.

5. The system of claim 4, wherein the control circuitry is configured to operate the buck converter into a two-level (2L) mode and a three-level (3L) mode, wherein the 2L mode corresponds to the control circuitry switching operation of the buck converter between the AB mode and the CD mode, and wherein the 3L mode corresponds to the control circuitry switching operation of the buck converter between the CD mode, the BD mode, the AC mode, and the AB mode.

6. The system of claim 5, wherein the control circuitry is configured to operate control the buck converter to isolate the capacitor from the current at least in part by operating the buck converter from the 3L mode to the 2L mode.

7. The system of claim 3, wherein the capacitor comprises a first terminal and a second terminal, wherein the first terminal is coupled to the first node, and wherein the second terminal is coupled to the third node.

8. The system of claim 7, wherein the voltage across the capacitor, when tracked over time, corresponds to a voltage waveform that crosses a target average voltage value.

9. The system of claim 1, wherein the current comprises a current waveform with a zero-crossing.

10. A non-transitory, tangible, computer-readable medium comprising instructions that, when executed by a processor, are configured to cause control circuitry to perform operations comprising:
  determining that a voltage of a capacitor crosses a threshold voltage, wherein a multi-level buck converter comprises a plurality of switches and the capacitor;
  isolating, via the plurality of switches, the capacitor from a current delivered to a load based on the voltage of the capacitor crossing the threshold voltage;
  adjusting the voltage of the capacitor after the capacitor is electrically isolated from the current;
  determining that the voltage of the capacitor is within a target voltage range associated with the threshold voltage; and
  coupling, via the plurality of switches, the capacitor to the load based on the voltage of the capacitor being within the target voltage range.

11. The non-transitory, tangible, computer-readable medium of claim 10, wherein adjusting the voltage of the capacitor after the capacitor is electrically isolated from the current comprises:
  determining an amount by which to discharge the capacitor; and
  performing multiple adjustment operations to discharge the voltage of the capacitor by the amount over time.

12. The non-transitory, tangible, computer-readable medium of claim 10, wherein isolating, via the control circuitry, the capacitor from the current comprises:
  controlling, via the control circuitry, a first pair of switches of the plurality of switches to turn on, wherein the first pair of switches is configured to couple to an input voltage, a first contact of the capacitor, an inductor; and
  controlling, via the control circuitry, a second pair of switches of the plurality of switches to turn off, wherein the second pair of switches is configured to couple to a ground voltage, a second contact of the capacitor, and the inductor.

13. The non-transitory, tangible, computer-readable medium method of claim 10, wherein isolating the capacitor from the current occurs at an at least partially overlapping time as controlling another multi-level buck converter to supply a different output voltage to another load.

14. The non-transitory, tangible, computer-readable medium of claim 10, wherein determining that the voltage of the capacitor crosses the threshold voltage comprises:
  determining to operate the multi-level buck converter in a first power mode based on determining to operate the load in the first power mode, wherein the multi-level buck converter is configured to be operated in a plurality of power modes as a power mode of the load changes; and
  receiving the threshold voltage and the target voltage range based on the first power mode.

15. The non-transitory, tangible, computer-readable medium of claim 10, wherein the voltage of the capacitor comprises a voltage waveform that crosses a target average voltage value.

16. A non-transitory, tangible, computer-readable medium comprising instructions that, when executed by a processor, are configured to cause control circuitry to perform operations comprising:
  receiving an indication of a voltage set point and a voltage operating range corresponding to a power mode of a load, wherein a buck converter is configured to supply the load with power based on the voltage set point and a voltage of a flying capacitor;
  determining that the voltage of a capacitor is outside the voltage operating range;
  controlling the buck converter to isolate the capacitor from the load based on the voltage of the capacitor being outside the voltage operating range; and
  controlling auxiliary circuitry coupled to a plurality of nodes of the buck converter to adjust the voltage of the capacitor based on the capacitor being electrically isolated from the load.

17. The non-transitory, tangible, computer-readable medium of claim 16, wherein the operations comprise:
  determining that the voltage of the capacitor is within a target voltage range; and
  coupling the capacitor to the load based on the voltage of the capacitor being within the target voltage range.

18. The non-transitory, tangible, computer-readable medium of claim 16, wherein the operations comprise:
  receiving an additional indication of an additional voltage set point and an additional voltage operating range corresponding to an additional power mode of the load, wherein the load operated in the power mode is configured to use less power than in the additional power mode.

19. The non-transitory, tangible, computer-readable medium of claim 16, wherein the voltage of the capacitor corresponds to a voltage waveform that crosses a target average voltage value.

20. The non-transitory, tangible, computer-readable medium of claim 16, wherein controlling the buck converter to electrically isolate the capacitor from the load comprises operating the buck converter from a three-level mode to a two-level mode configured to isolate the capacitor through pairs of transistors switching.

* * * * *